Jan. 19, 1960     E. P. BRINKEL     2,921,602
SHIFTABLE MECHANISM WITH MOMENTARILY ACTUATED CONTROL
Filed Oct. 23, 1957     4 Sheets-Sheet 1
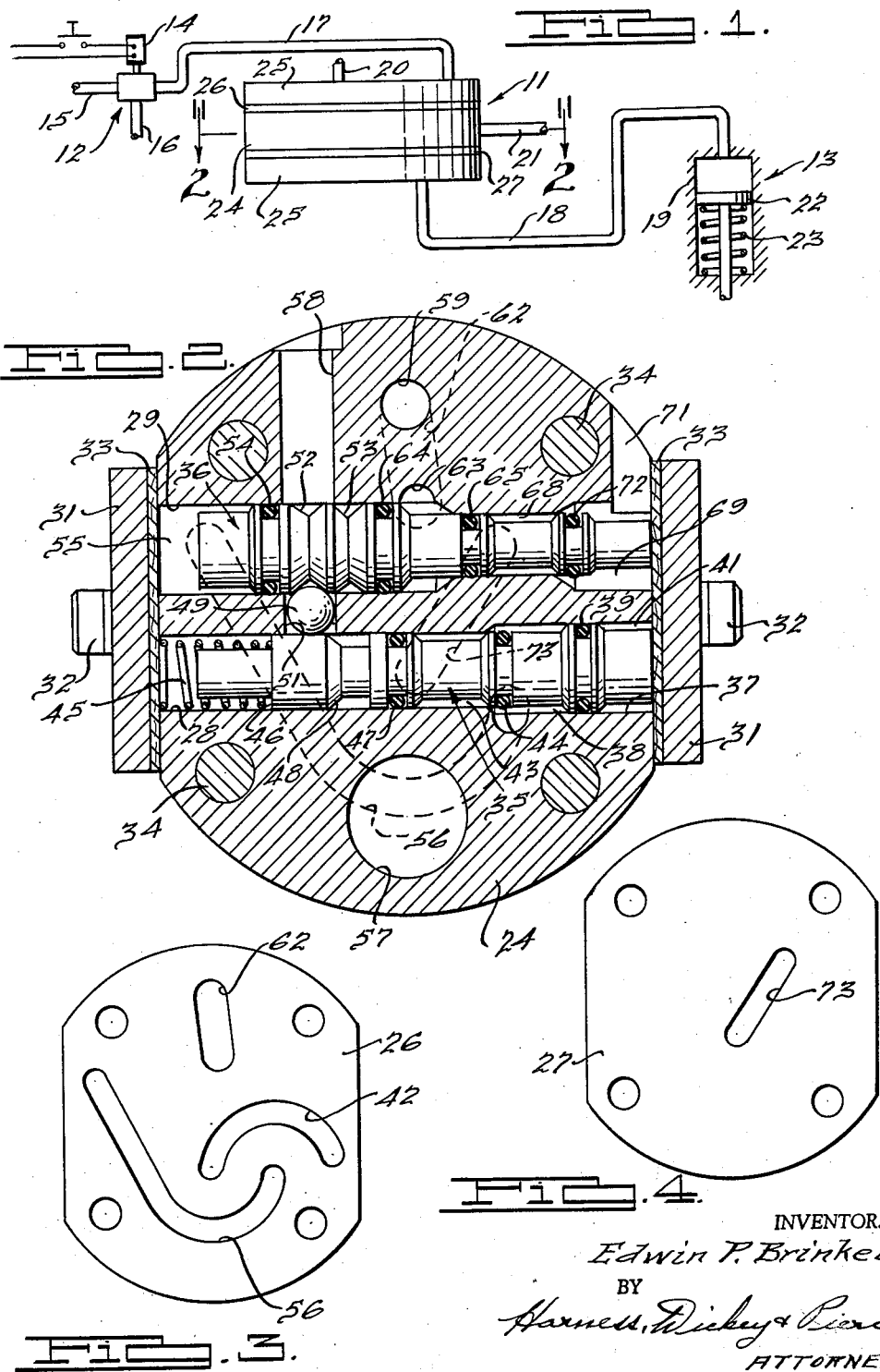
INVENTOR.
Edwin P. Brinkel.
BY
Harness, Dickey & Pierce
ATTORNEYS.

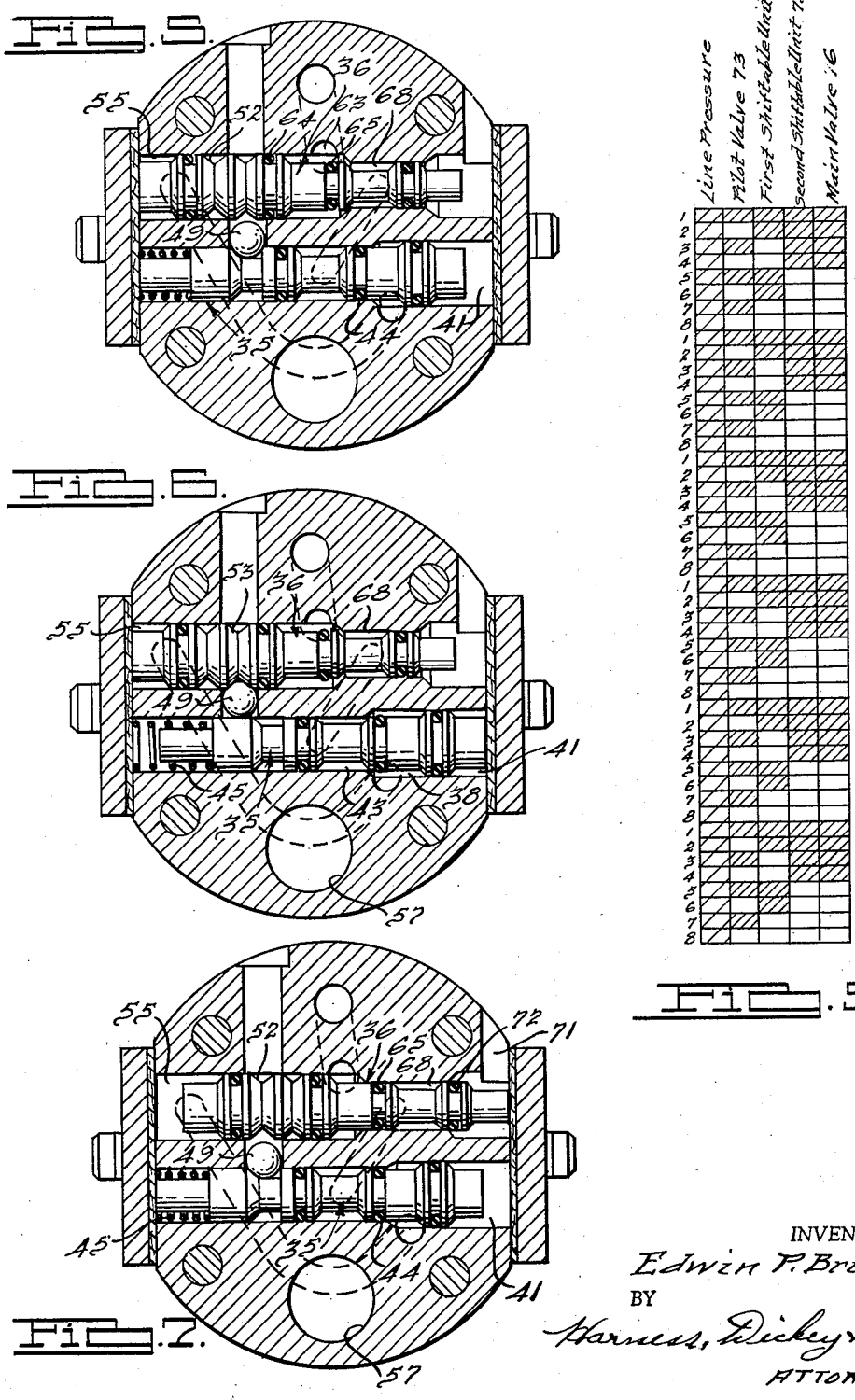

Jan. 19, 1960     E. P. BRINKEL     2,921,602
SHIFTABLE MECHANISM WITH MOMENTARILY ACTUATED CONTROL
Filed Oct. 23, 1957     4 Sheets-Sheet 3
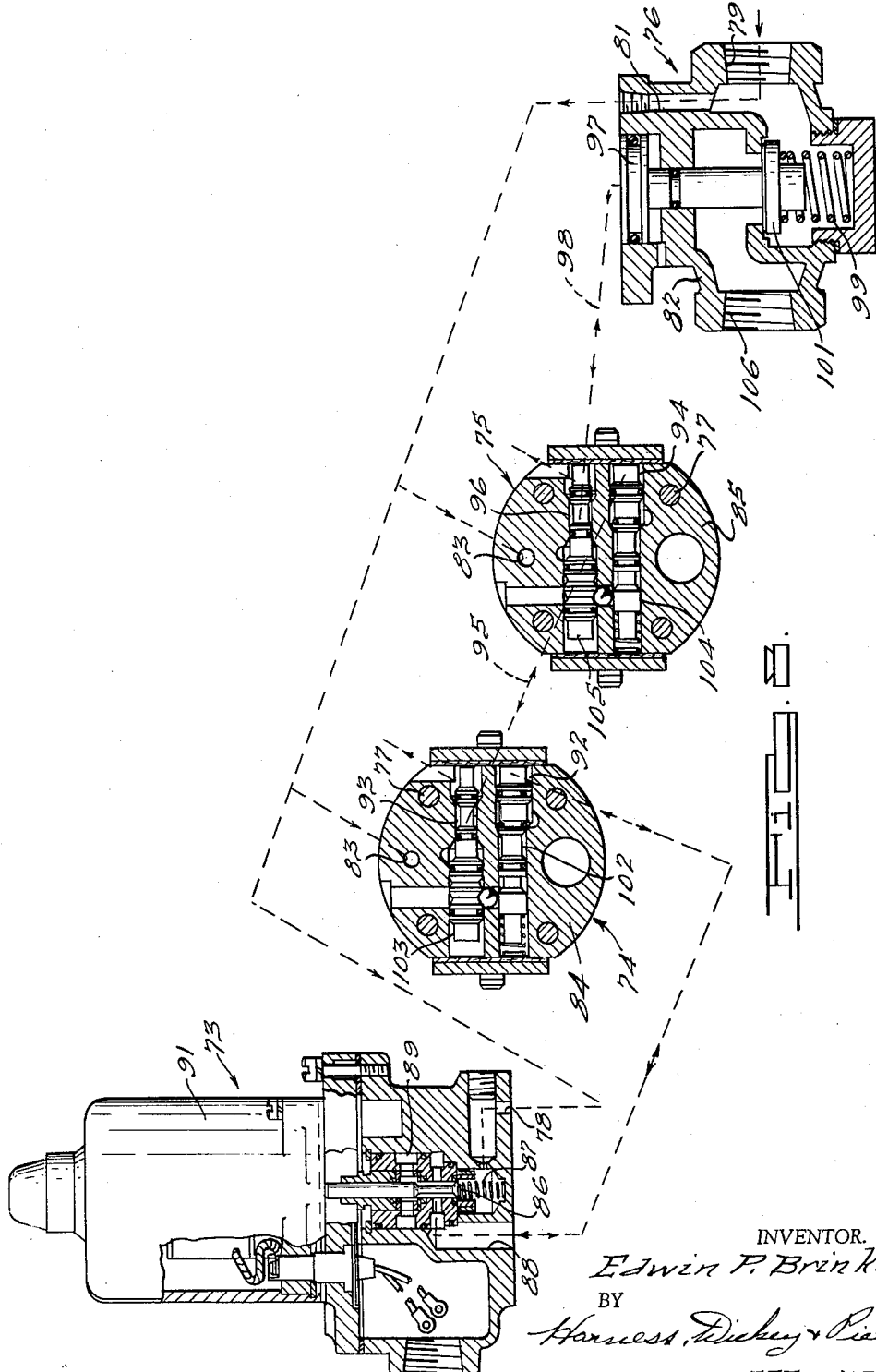
INVENTOR.
Edwin P. Brinkel.
BY
ATTORNEYS.

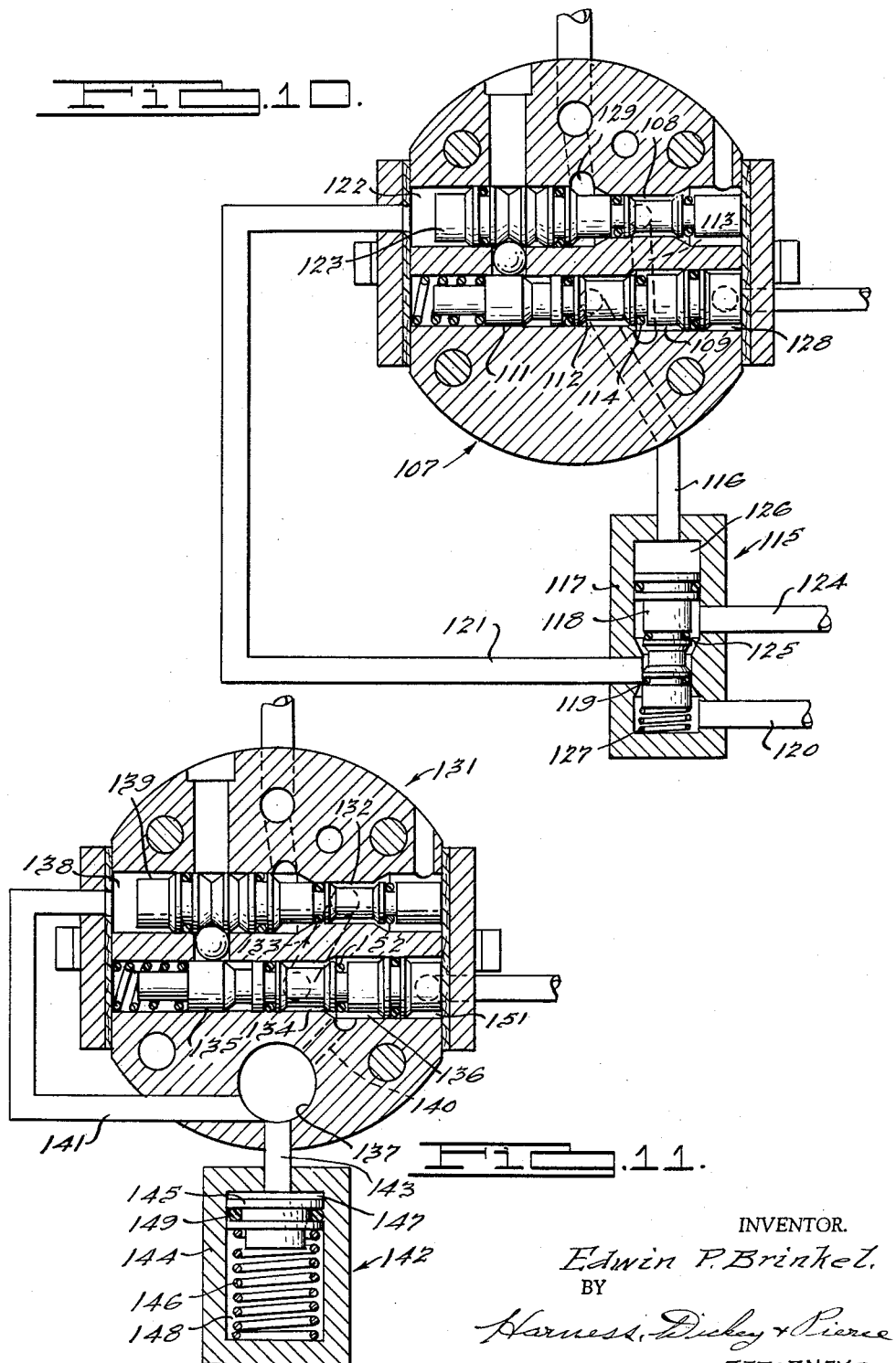

United States Patent Office 2,921,602
Patented Jan. 19, 1960

2,921,602

SHIFTABLE MECHANISM WITH MOMENTARILY ACTUATED CONTROL

Edwin P. Brinkel, Royal Oak, Mich., assignor to Ross Operating Valve Company, Detroit, Mich., a corporation of Michigan Application October 23, 1957, Serial No. 691,858

16 Claims. (Cl. 137—622.5)

This invention relates to shiftable mechanisms, and more particularly to devices which are alternately actuatable between two positions in response to a momentary signal.

It is an object of the invention to provide an improved shiftable mechanism of this type which eliminates the necessity of mechanical linkages and is of greatly simplified construction, thus requiring lower machining costs during manufacture and presenting a minimum of maintenance problems.

It is another object to provide an improved shiftable mechanism of this type which may be fabricated of relatively small size and may be so shaped as to be capable of assembly as an integral part of a unit which is being controlled, thus resulting in a saving of space and reducing the numbers of parts which must be stocked in an industrial establishment for the assembly of such systems.

It is a further object to provide an improved shiftable mechanism of the above character which is entirely fluid operated and may be used to control different types of valves either singly or in sequence, enabling the use of a number of the improved mechanisms in series to achieve a counting operation.

It is also an object to provide an improved shiftable mechanism of the above nature which is operable either by compressible or incompressible fluids with only minor changes in the constructional features of the unit.

Other objects, features, and advantages of the present invention will become apparent from the subsequent description, taken in conjunction with the accompanying drawings.

In the drawings:

Fig. 1 is a schematic view of a system utilizing one of the improved shiftable mechanisms of this invention to control a three-way valve for a fluid motor;

Figure 2 is a cross-sectional view taken along the line 2—2 of Figure 1 and showing the internal construction of the shiftable mechanism.

Figure 3 is a plan view of the top gasket of the mechanism shown in Figure 1 illustrating fluid passageways and ports for the device;

Figure 4 is a view similar to Figure 3 of the bottom gasket showing a passageway therein;

Figure 5 is a view similar to Figure 2 showing the control spool in its release position and the actuating spool in its supply position;

Figure 6 is a view similar to Figure 5 showing the control spool in its locking position;

Figure 7 is a view similar to Figure 6 showing the control spool in its release position and the actuating spool in its exhaust position.

Figure 8 is an exploded view, partly in cross section, of a suitable assembly comprising a pilot valve, two shiftable mechanisms and a controlled main valve which will be operated once for every four operations of the pilot valve.

Figure 9 is a chart showing the operational sequence of the pilot valve, shiftable mechanisms and main valve in Figure 8;

Figure 10 is a partially schematic view of a suitable system whereby the improved shiftable mechanism may be operated by an incompressible fluid through the interposition of an additional valve; and Figure 11 is a view similar to Figure 10 of a modified system for incompressible-fluid operation which utilizes an accumulator.

In general terms, the illustrated embodiment of the invention comprises a pair of spools slidably mounted in parallel relation within a housing, one of said spools being a control spool which controls shifting of the second or actuating spool between two extreme positions. The control spool is spring-urged in one direction and may be moved in the opposite direction either momentarily or for a longer period by any desired means, such as by hand or by fluid controlled by a pilot valve. A valve on the control spool controls fluid flowing to and from differential areas formed on the actuating spool in order to shift the latter between its positions. Although the actuating spool may be used to actuate other devices, the illustrated embodiment shows a three-way valve formed on this spool. A detent is disposed between the two spools and is movable by the control spool into locking position with respect to the actuating spool when the control spool is in one position. Movement of the control spool to its other position will release the detent so that the actuating spool may be shifted.

Referring more particularly to the drawings, Figure 1 shows a suitable system in which the novel mechanism, indicated generally at 11, is interposed between a pilot valve generally indicated at 12 and a fluid motor generally indicated at 13. In the schematic showing of Figure 1, pilot valve 12 is operable by a solenoid 14 controlled by a push button switch, and is provided with a pressure inlet conduit 15 and an exhaust conduit 16. A working conduit 17 leads from pilot valve 12 to shiftable mechanism 11 which is adapted to actuate a three-way valve (not seen in Figure 1) for controlling motor 13. For this purpose, conduit 17 may be regarded as the control conduit for mechanism 11. A working conduit 18 leads from the mechanism to the cylinder 19 of motor 13, the working conduit serving to conduct fluid from a pressure supply conduit 20 to the motor, and to exhaust the motor through an exhaust conduit 21. A piston 22 disposed within cylinder 19 is actuatable in a downward direction by pressure applied to the upper end of the cylinder and is movable upwardly by a coil spring 23 engageable with the underside of the piston.

As seen in Figures 1 and 2, mechanism 11 comprises a housing 24 and a pair of end caps 25, gaskets 26 and 27 being interposed between housing 24 and top and bottom end caps 25, respectively. The housing is of generally disk-like shape and has a pair of parallel bores 28 and 29, end caps 31 closing the ends of these bores and being held in place by screws 32. Sheets 33 of resilient material may be disposed within caps 31 to act as buffer stops when the spools reach their extreme positions. Additional bolts 34 serve to hold together the housing, gaskets and end caps. A control spool generally indicated at 35 is slidably mounted within bore 28 while an actuating spool generally indicated at 36 is mounted within bore 29. Bore 28 has a wider portion 37 at one end thereof, and a chamber 38 exists between this larger diameter bore and the adjacent portion of spool 35. The right-hand end of chamber 38, as seen in Figure 2, is closed by a seal 39 carried by spool 35, a chamber 41 being formed within bore 37 to the right of seal 39. Chamber 41 is connectable to pilot conduit 17 by a passageway 42 formed in top gasket 26, as seen in Figure 3, appropriate ports (not seen) being disposed between passageway 42 and conduit 17 and chamber 41, respectively. An annular chamber 43 is formed between spool 35 and bore 28 immediately to the left of bore 37, and a valve 44 is carried by spool 35, this valve closing the connection between chambers 38 and 43 when spool 35 is moved to the left by pressure applied to chamber 41. A helical compression spring 45 is engageable with a shoulder 46 at the left-hand end of spool 35 and urges the spool to the right into a position in which valve 44 is open. A seal 47 prevents leakage of fluid from chamber 43.

Spool 35 is provided to the left of seal 47 with a detent cam surface 48, this surface being flared outwardly to the left between a narrower and a wider portion of the spool. A detent in the form of a ball 49 is disposed within a guide aperture 51 which connects bores 28 and 29. The diameter of detent 49 is such that when spool 35 is in the right-hand position shown in Figure 2, the detent will project into bore 29. On the other hand, when spool 35 is moved to the left as seen in Figure 5, detent 49 may move downwardly until it is withdrawn from bore 29. Actuating spool 36 is provided with a pair of adjacent flared grooves 52 and 53 which are adapted to alternately receive detent 49 in order to lock spool 36 in either of its positions. A seal 54 is disposed to the left of groove 52, a return chamber 55 being formed between seal 54 and the adjacent end of bore 29. This chamber is connected to chamber 38 by means of a passageway 56 in gasket 26 which leads past and is connected to an accumulator chamber 57 formed within the housing. A vent 58 is provided in housing 24 to prevent pressure from accumulating in the left hand end of bore 28, the vent being connected to the bore by means of aperture 51.

Housing 24 is provided with a pressure supply port 59 to which pressure conduit 20 is connected, this port being connected by a passageway 62 in gasket 26 with a pressure chamber 63 formed at an intermediate portion of bore 29. Spool 36 carries a seal 64 to the left of chamber 63 and a seal 65 to the right of this chamber, seal 64 having a larger diameter than seal 65 so that pressure in chamber 63 will urge spool 36 to the left. The narrow portion of bore 29 within which seal 65 is disposed forms an annular working chamber 68 between the bore and spool, and conduit 18 is connected with chamber 68 and leads to motor 13. With spool 36 in the position shown in Figure 2, seal 65 forms a closed valve between pressure chamber 63 and working chamber 68. When spool 36 is moved to the left as seen in Figure 5, working chamber 68 will be connected to pressure chamber 63.

A chamber 69 is formed at the right-hand end of bore 29 and is connected to the atmosphere by an exhaust port 71. A valve 72 is carried by spool 36 and is disposed between chambers 69 and 68, this valve being open when the spool is in its right-hand position and closed when the spool is in its left-hand position. It should be noted that the diameter of valves 72 and 65 is less than the diameter of seal 54.

Bottom gasket 27 has a passageway 73 formed therein, this passageway connecting chambers 68 and 43. It will thus be noted that when spool 36 is in its left-hand position as seen in Figure 5, chamber 43 will be pressurized. With spool 35 in its right-hand position as shown in Figure 6, this pressure will be conducted to return chamber 55 through chamber 38, passageway 56, chamber 57 and passageway 58. For purposes which will hereinafter appear, valve 44 will close the connection between chambers 43 and 38 as spool 35 moves to the left before detent 49 is permitted to drop away from spool 36.

*Operation*

Assuming an initial condition in which the parts of unit 11 are in the position shown in Figure 2, piston 22 of motor 13 is in its upper position, and pilot valve 12 is in its exhaust position, energization of pilot solenoid 14 will move valve 12 to its pressure position, thus permitting fluid under pressure to flow from pressure conduit 15 through conduit 17 to chamber 41. This will cause control spool 35 to move to the left toward the position shown in Figure 5. Valve 44 will first close, the effect being to disconnect chamber 55 from chamber 68. Further movement of spool 35 to its extreme left-hand position will permit detent 49 to be withdrawn from groove 52 of spool 36. Due to the pressure acting on the differential areas of seals 64 and 65, spool 36 will be moved to the left. As this is done, valve 65 will open and valve 72 will close, connecting working chamber 68 to pressure chamber 63. Motor 13 will thus be actuated to move piston 22 downwardly.

Upon return of spool 35 to the position shown in Figure 6 by exhaustion of chamber 41 and the action of spring 45, detent 49 will first be moved upwardly into its locked position with respect to groove 53. After actuating spool 36 has been locked, further movement of spool 35 to the right will cause chamber 68 to be connected to chambers 55 and 57 through passageway 73, chamber 43, chamber 38 and passageway 56. This will cause pressure to accumulate in chambers 55 and 57, the latter chamber being sufficiently large so that both chambers together will permit sufficient fluid to accumulate for the later movement of spool 36. Spool 36 will not be immediately affected by this pressure because of the locked position of detent 49. It should be noted that the present description concerns itself with operation of the unit by compressible fluids or gases, although as will be described later the unit in a modified form could also be operated with an incompressible fluid such as water. The pressure within return chamber 55 will create a force urging spool 36 to the right, but this force will be prevented from taking effect by the presence of detent 49 within groove 53.

When it is desired to return motor 13 to its upper position, spool 35 will again be moved to the left by pressurization of chamber 41 through movement of pilot valve 12. Chambers 57 and 55 will be sealed off from working chamber 68 by leftward movement of valve 44. Detent 49 will then be permitted to drop from groove 53 as seen in Figure 7, and the accumulated pressure in chambers 55 and 57 will cause rightward movement of actuating spool 36. This will cause valve 65 to close and valve 72 to open, connecting cylinder 19 to exhaust port 71. Piston 22 will thus rise under the influence of spring 23 and the motor will be turned to its retracted position.

Upon movement of pilot valve 12 to its exhaust position, chamber 41 will again be exhausted, and spring 45 will move control spool 35 to its right-hand position. This will cause detent 49 to again be engaged with groove 52, and the parts will be returned to the position of Figure 2. It should be noted that since exhaustion of chambers 55 and 57 will take place only after spool 36 is locked, there will be no possibility of reversal of movement of spool 36 due to the reapplication of pressure to chamber 63.

Figure 8 illustrates an arrangement consisting of two of the novel shiftable units together with a solenoid-operated pilot valve and a two-way main valve assembled in such a manner that the main valve will be moved once for each four movements of the pilot valve. The pilot valve is generally indicated at 73 and is mounted above a first shiftable unit generally indicated at 74 and a second unit 75. Mounted below unit 75 is a two-way main valve generally indicated at 76. The units are so constructed that they may be placed in stacked relation, being held together by bolts 77 passing through the units. Pilot valve 73 has an inlet port 78 which is connected to the inlet port 79 of main valve 76 by a passageway 81 in main valve housing 82 and aligned passageways 83 in housings 84 and 85 of units 74 and 75, respectively. Valve unit 73, which may be of a conventional type, has a valve 86 urged upwardly by a spring 87 into a position in which inlet port 78 is disconnected from working port 88, the latter being connected to an exhaust port 89. When solenoid 91 of the pilot valve is energized, valve 86 is moved downwardly, disconnecting working port 88 from exhaust port 89 and connecting it to inlet port 78.

When working port 88 of the pilot valve is so pressurized, fluid will be conducted through passageway 42 of gasket 26, seen in Figure 3, to control spool actuating chamber 92 of shiftable unit 74. Working chamber 93 of unit 74 is connected to control spool actuating chamber 94 of unit 75 by a passageway shown schematically at 95. Likewise, working chamber 96 of unit 75 is connected to a chamber above operating piston 97 of valve 76 by a passageway shown schematically at 98. A coil spring 99 urges valve member 101 upwardly against the action of piston 97 in a conventional manner.

The operation of the arrangement shown in Figure 8 may be clearly demonstrated by reference to Figure 9, which is a chart showing the relative movements of pilot valve 73, first shiftable unit 74, second shiftable unit 75 and main valve 76. In the chart, shaded areas indicate pressure at the working port of the corresponding unit, whereas light areas indicate exhaust pressure at the working port, or in the case of valve 76, a shutoff condition. The first column indicates a constant line pressure, whereas the second column indicates alternate pressurizing and exhaustion of working port 88 of pivot valve 73. It should be borne in mind that the relative sizes of these areas are unimportant for purposes of the discussion, and that in fact solenoid 91 could be energized only momentarily so that port 8 is pressurized only for momentary intervals.

Line 1 of the chart indicates what happens when solenoid 91 is initially energized. Working port 88 of the pilot valve will be connected to pressure, and this will cause shifting of unit 74 so that working chamber 93 thereof will be pressurized, as described previously. Unit 75 will likewise be immediately shifted to pressurize its working chamber 96, and since the latter is connected to piston 97, main valve 76 will be shifted to its open position.

Line 2 of the chart indicates the results of de-energizing solenoid 91. Pilot valve working port 88 will be connected to exhaust, which will permit control spool 102 of unit 74 to return to its locking position. Actuating spool 103 of unit 74 will remain fixed, and unit 75 as well as main valve 76 will therefore not change their positions.

Upon re-energization of solenoid 91 as indicated on line 3 of the chart, spool 102 of unit 74 will again be shifted to the left, permitting spool 103 to be shifted to the right and connecting working chamber 93 to exhaust. This will permit control spool 104 of unit 75 to be shifted to the right, locking actuating spool 105 of unit 75 in its pressure position. Valve 76 will thus not be disturbed by this movement.

Upon de-energization of solenoid 91 for the second time, as indicated on line 4, spool 102 will again be shifted rightwardly to its locking position and neither unit 75 nor valve 76 will be disturbed. However, when solenoid 91 is energized for the third time, as indicated on line 5 of the chart, spool 103 of unit 74 will again be shifted to the left, pressurizing working chamber 94 of unit 75. This will permit spool 105 of unit 75 to again be shifted rightwardly, connecting passageway 98 to exhaust and thus permitting spring 99 to lift valve member 101 of valve 76. Working port 106 of valve 76 will thus be disconnected from pressure port 79, as indicated by the white area in the chart.

It will be apparent from an analysis of the succeeding movements of the parts that valve 76 will remain in its shutoff position until the ninth movement of pilot valve 73. The main valve will thus be shifted each time the pilot valve moves four times. An arrangement of this kind could obviously be varied by having more than two shiftable members, and the movement of valve 76 (or other fluid-operated unit) with respect to valve 73 will vary accordingly. For example, should a third shiftable mechanism be inserted in the assembly, main valve 76 would shift its position each time the pilot valve shifted eight times. The usefulness of a counting mechanism of this type in industrial and commercial establishments will be apparent.

Figure 10 shows schematically an arrangement which permits use of the shiftable mechanism of this invention by an incompressible as well as a compressible fluid. The shiftable mechanism, generally indicated at 107, is generally similar in its construction to those shown previously, except for the fact that working chamber 108 is connected to chamber 109 of control spool 111 instead of to chamber 112 as in the previous embodiment. A conduit 113 is shown schematically as comprising this connection, it being understood that this conduit could comprise a gasket slot or any other appropriate connection. Chamber 112 is separated from chamber 109 by a valve 114 carried by control spool 111, and is connected to a three-way normally closed valve generally indicated at 115 by a conduit shown schematically at 116. Valve 115 has a housing 117 carrying a valve spool 118 therein. This spool carries a valve 119 which is disposed between an inlet conduit 120 leading to housing 117 and a conduit 121 which is connected to chamber 122 at the left-hand end of actuating spool 123. An exhaust conduit 124 is also connected to valve housing 117, and a valve 125 is disposed between conduits 121 and 124. Conduit 116 is connected to a chamber 126 at the upper end of housing 117, and a spring 127 is disposed on the underside of the spool. The arrangement is such that spring 127 will normally hold valve spool 118 in its upper position in which conduit 121 is connected to exhaust conduit 124. When chamber 126 is pressurized, valve 119 will open and valve 125 will close, connecting conduit 121 to pressure inlet conduit 120.

In operation of the construction shown in Figure 10, assuming an initial condition in which the parts are disposed as shown in this figure, pressurization of right-hand chamber 128 of spool 111 will cause this spool to shift leftwardly, releasing spool 123 which will shift to the left for the reasons described above. This will cause working chamber 108 and control spool chamber 109 to be connected to pressure port 129; however, this pressure will not be transmitted to chamber 126 of valve 115 since valve 114 is closed. Upon reduction of pressure in chamber 128, spool 111 will shift to the right, locking spool 123 in position. Pressure from chamber 109 will be transmitted through chamber 112 and conduit 116 to chamber 126, causing valve spool 118 to move downwardly. This will cause pressurization of chamber 122 from line 120. Upon the second leftward movement of spool 111, spool 123 will thus be shifted to the right due to the pressure in chamber 122. It should be noted at this point that use of an incompressible fluid will not affect operation of the device since pressure will be available from line 120, and no accumulator chamber will thus be needed. Rightward movement of spool 111 will again lock spool 123, this time in its rightward position as seen in Figure 10.

Figure 11 shows another arrangement for utilizing compressible or incompressible fluids in conjunction with the shiftable mechanism of this invention. The mechanism is indicated generally at 131 and is constructed in a manner similar to the first-described embodiment of the invention. Working chamber 132 is connected by a conduit indicated schematically at 133 to chamber 134 adjacent control spool 135, and chamber 136 adjacent spool 135 is connected to a chamber 137 and to chamber 138 at the left-hand end of actuating spool 139 by conduits indicated schematically at 140 and 141. A separate accumulator generally indicated at 142 is connected to accumulator chamber 137 by a conduit indicated schematically at 143. This accumulator has a cylindrical housing 144 within which is disposed a piston 145, a spring 146 being disposed beneath piston 145 and urging the latter upwardly. Chamber 147 at the upper end of housing 144 is adapted to be filled with a compressible or incompressible fluid in such a manner as to cause piston 145 to descend, chambers 147 and 148 being separated by a seal 149 carried by piston 145. If desired, a compressible fluid may be disposed within chamber 148 below piston 145 in addition to or in place of spring 146, or a vent may be provided for this chamber.

In operation of the arrangement shown in Figure 11, assuming an initial position of the parts as shown in this figure, pressurization of chamber 151 at the right-hand end of spool 135 will cause leftward shifting of this spool and release of spool 139. The latter spool will shift to the left and will cause pressurization of chamber 132 and therefore of chamber 134, the latter being at this time separated from chamber 136 by valve 152. Upon release of pressure within chamber 151, spool 135 will move to the right, locking spool 139 in position, and then connecting chamber 137, accumulator chamber 147 and chamber 138 to pressure. Piston 145 will move downwardly, compressing the fluid and spring within chamber 148. When spool 135 is next moved to the left, release of spool 139 will cause the latter spool to shift to the right because of the pressure within chamber 138, this pressure being maintained by the upwardly moving piston 145 under the influence of the compressible fluid and spring within chamber 148. Rightward movement of spool 135 will then lock spool 139 in its position as shown in Figure 11.

It will thus be seen that an improved shiftable mechanism has been provided which will move between alternate positions in response to the momentary actuation of a control element, the mechanism being entirely fluid-operated and occupying a minimum of space. The unit is capable of controlling the movement of a variety of elements, such as valves, and may be utilized either singly or in combination with identical units to achieve a counting function.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A fluid-operated shiftable mechanism comprising a housing, a control spool and an actuating spool slidably mounted within said housing, each of said spools being movable between first and second positions, resilient means urging said control spool toward its first position, a chamber adapted to be pressurized for moving the control spool toward its second position, a detent disposed between said spools and movable to locking position with respect to said actuating spool when said control spool is in its first position and said actuating spool is in either of its positions, said detent being retractable when said control spool is in its second position, means urging said actuating spool to its second position, a return chamber adjacent said actuating spool, pressure in said return chamber urging said actuating spool to its first position, and means responsive to movement of said control spool to its first position when said actuating spool is in its second position for pressurizing said return chamber.

2. In a device of the class described, a control spool movable between a first position and a second position, a spring urging said spool to its first position, a piston on said spool for moving the spool to its second position, a valve on said spool movable between an open position when said spool is in its first position and a closed position when said spool is in its second position, a detent movable between a locking position when said spool is in its first position and a retracted position when said spool is in its second position, an actuating spool movable between a first position and a second position, said detent serving to hold said actuating spool in either of its positions when said detent is in its locking position, first piston means on said actuating spool for moving the actuating spool to its first position, second piston means tending to move said actuating spool to its second position, said first piston means having a greater area than said second piston means, means for continuously supplying pressure to said second piston means, and means for conducting fluid under pressure to said first piston means, said valve being interposed in said last-mentioned means.

3. The combination according to claim 2, the relative positions of said valve and detent being such that said valve will close before said detent is retracted when said control spool is moved from its first position to its second position.

4. The combination according to claim 2, said detent comprising a ball, and a pair of spaced grooves on said actuating spool engageable by said ball when the actuating spool is in either of its positions.

5. The combination according to claim 2, further provided with a working chamber adjacent said actuating spool, an exhaust port, an exhaust valve between said working chamber and exhaust port, said valve being open when said actuating spool is in its first position and closed when said actuating spool is in its second position, and a valve between said working chamber and second piston means, said last-mentioned valve being closed when said actuating spool is in its first position and open when the actuating spool is in its second position.

6. In a device of the class described, a control spool movable between two positions, a spring urging said control spool toward its first position, a chamber adapted to be pressurized, a piston on said spool at one end of said chamber for moving the spool toward its second position, a detent movable by said spool from a retracted position to an extended position when said spool is moved to its first position, a valve on said spool movable between an open position to a closed position when said spool is moved from its first position to its second position, an actuating spool movable between a first and a second position, means on said actuating spool engageable by said detent when in its extended position, a pressure chamber an exhaust port and a working chamber adjacent said actuating spool, a first valve between said pressure and working chambers, a second valve between said working chamber and exhaust port, said first valve being movable from a closed to an open position and said second valve being movable from an open position to a closed position when said actuating spool is moved from its first to its second position, a first piston area adapted to be subjected to fluid pressure to move said actuating spool from its second to its first position, a second piston area exposed to said pressure chamber for moving said spool from its first position to its second position, said second piston area being less than said first piston area, and passageway means between said working chamber and said first piston area, said control spool valve being interposed in said passageway means.

7. The combination according to claim 6, further provided with an accumulator chamber in the passageway means leading to said first piston area.

8. In combination, a housing, a pair of spool slidable in parallel relation within said housing, said spools comprising a control spool and an actuating spool, each spool being movable between a first position and a second position, an actuating chamber at one end of said control spool for moving the control spool to its second position, a spring at the other end of said control spool for moving the control spool to its first position, a valve at an intermediate portion of said control spool, said valve being closed when said control spool is in its second position and open when said control spool is in its first position, a detent movable from a retracted position when said control spool is in its second position to an extended position when said control spool is in its first position, said actuating spool including a pair of grooves engageable by said detent when said detent is in its extended position and said actuating spool is in either of its two positions, a first piston area at one end of said actuating spool for moving the actuating spool toward its first position, a pressure chamber adjacent said actuating spool, a second piston area on said actuating spool less than said first piston area and connected to said pressure chamber for moving the actuating spool to its second position, a working chamber adjacent said actuating spool, a first valve between said pressure chamber and working chamber, an exhaust port in said housing, a second valve between said working chamber and exhaust port, and a connection between said working chamber and one side of said control spool valve, whereby said first piston area will be pressurized when said actuating spool is in its second position and said control spool is in its first position.

9. The combination according to claim 8, said housing being disk-shaped, a connection leading from one side of said housing to the actuating chamber of said control spool, and a connection leading from said actuating spool working chamber to the other side of said housing, whereby said housing may be interposed between a pilot valve and a main valve to be operated thereby.

10. A fluid-operated shiftable mechanism comprising a housing, a control spool and an actuating spool slidably mounted within said housing, each of said spools being movable between first and second positions, a spring urging said control spool toward its first position, a chamber adapted to be pressurized for moving the control spool toward its second position, a detent disposed between said spools and movable to locking position with respect to said actuating spool when said control spool is in its first position and said actuating spool is in either of its positions, said detent being retractable when said control spool is in its second position, a pressure chamber adjacent said actuating spool, pressure in said chamber urging said actuating spool to its second position, a return chamber adjacent said actuating spool, pressure in said return chamber urging said actuating spool to its first position, a three-way valve connected to said return chamber, said three-way valve being movable between a first position in which said return chamber is connected to exhaust and a second position in which said return chamber is connected to line pressure, and means responsive to movement of said control spool to its first position when said actuating means is in its second position for moving said three-way valve to its second position.

11. A fluid-operated shiftable mechanism comprising a housing, a control spool and an actuating spool slidably mounted within said housing, each of said spools being movable between first and second positions, a spring urging said control spool toward its first position, a chamber adapted to be pressurized for moving the control spool toward its second position, a detent disposed between said spools and movable to locking position with respect to said actuating spool when said control spool is in its first position and said actuating spool is in either of its positions, said detent being retractable when said control spool is in its second position, a pressure chamber adjacent said actuating spool, pressure in said chamber urging said actuating spool to its second position, a return chamber adjacent said actuating spool, pressure in said return chamber urging said actuating spool to its first position, an accumulator having a piston, resilient means on one side of said piston, a chamber on the other side of said piston connected to said return chamber, and means responsive to movement of said control spool to its first position when said actuating spool is in its second position for pressurizing said return chamber and accumulator chamber.

12. A fluid-operated shiftable mechanism comprising a housing, a control spool and an actuating spool slidably mounted within said housing, each of said spools being movable between first and second positions, resilient means urging said control spool toward its first position, a chamber adapted to be pressurized for moving the control spool toward its second position, a detent disposed between said spools and movable to locking position with respect to said actuating spool when said control spool is in its first position and said actuating spool is in either of its positions, said detent being retractable when said control spool is in its second position, means urging said actuating spool to its second position, a return chamber adjacent said actuating spool, pressure in said return chamber urging said actuating spool to its first position, means responsive to movement of said control spool to its first position when said actuating spool is in its second position for pressurizing said return chamber, and means responsive to movement of said spools to their first positions for reducing the pressure in said return chamber.

13. A fluid-operated shiftable mechanism comprising a housing, a control spool and an actuating spool slidably mounted within said housing, each of said spools being movable between first and second positions, a spring urging said control spool toward its first position, a chamber adapted to be pressurized for moving the control spool toward its second position, a detent disposed between said spools and movable to locking position with respect to said actuating spool when said control spool is in its first position and said actuating spool is in either of its positions, said detent being retractable when said control spool is in its second position, a pressure chamber adjacent said actuating spool, pressure in said chamber urging said actuating spool to its second position, a return chamber adjacent said actuating spool, pressure in said return chamber urging said actuating spool to its first position, and means responsive to movement of said control spool to its first position when said actuating spool is in its second position for pressurizing said return chamber.

14. A fluid-operated shiftable mechanism comprising a housing, a control spool and an actuating spool slidably mounted within said housing, each of said spools being movable between first and second positions, resilient means urging said control spool toward its first position, a chamber adapted to be pressurized for moving the control spool toward its second position, a detent disposed between said spools and movable to locking position with respect to said actuating spool when said control spool is in its first position and said actuating spool is in either of its positions, said detent being retractable when said control spool is in its second position, a pressure chamber adjacent said actuating spool, pressure in said chamber urging said actuating spool to its second position, a return chamber adjacent said actuating spool, pressure in said return chamber urging said actuating spool to its first position, and means responsive to movement of said control spool to its first position when said actuating spool is in its second position for pressurizing said return chamber.

15. In a device of the class described, a control spool movable between a first position and a second position, resilient means urging said spool to its first position, a piston on said spool for moving the spool to its second position, a valve on said spool movable between an open position when said spool is in its first position and a closed position when said spool is in its second position, a detent movable between a locking position when said spool is in its first position and a retracted position when said spool is in its second position, an actuating spool movable between a first position and a second position, said detent serving to hold said actuating spool in either of its positions when said detent is in its locking position, first piston means on said actuating spool for moving the actuating spool to its first position, second piston means tending to move said actuating spool to its second position, said first piston means having a greater area than said second piston means, means for continuously supplying pressure to said second piston means, and means for conducting fluid under pressure to said first piston means, said valve being interposed in said last-mentioned means.

16. In a device of the class described, a housing, a control spool and an actuating spool slidably mounted in parallel relation in said housing, each of said spools being movable between first and second positions, resilient means urging said control spool toward its first position, means for moving the control spool toward its second position, a detent comprising a spherical member disposed between said spools, a cam surface on said control spool, a pair of inclined locking surfaces on said actuating spool, said detent being movable by said cam surface to locking position with respect to one of said locking surfaces when said control spool is in its first position and said actuating spool is in either of its positions, said detent being retractable by one of said inclined locking surfaces when said control spool is in its second position, means urging said actuating spool to its second position, a return chamber adjacent said actuating spool, pressure in said return chamber urging said actuating spool to its first position, and means responsive to movement of said control spool to its first position when said actuating spool is in its second position for pressurizing said return chamber.

References Cited in the file of this patent

UNITED STATES PATENTS

| 2,696,145 | Horlacher | Dec. 7, 1954 |

FOREIGN PATENTS

| 865,154 | France | Feb. 17, 1941 |